(12) United States Patent
Nishi et al.

(10) Patent No.: US 6,591,855 B2
(45) Date of Patent: Jul. 15, 2003

(54) FUEL CUTOFF VALVE

(75) Inventors: Hiroshi Nishi, Aichi-ken (JP);
Tomohiro Sugizaki, Aichi-ken (JP);
Tomohide Aoki, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/876,253

(22) Filed: Jun. 8, 2001

(65) Prior Publication Data

US 2001/0050104 A1 Dec. 13, 2001

(30) Foreign Application Priority Data

Jun. 8, 2000 (JP) .................................... 2000-171579
Jan. 19, 2001 (JP) ......................................... 2001-11652

(51) Int. Cl.[7] ............................................. F16K 24/04
(52) U.S. Cl. ........................................ 137/202; 137/43
(58) Field of Search ................................... 137/43, 202

(56) References Cited

U.S. PATENT DOCUMENTS

| | | | | | |
|---|---|---|---|---|---|
| 4,905,726 A | * | 3/1990 | Kasugai et al. | ............ | 137/202 |
| 5,313,978 A | * | 5/1994 | Takaki et al. | ................ | 137/43 |
| 5,443,561 A | * | 8/1995 | Sakata et al. | ............... | 137/202 |
| 5,529,086 A | * | 6/1996 | Kasugai et al. | ............ | 137/202 |
| 5,782,258 A | * | 7/1998 | Herbon et al. | ............ | 137/202 |
| 5,996,607 A | * | 12/1999 | Bergsma et al. | ............ | 137/202 |
| 6,145,532 A | * | 11/2000 | Tuckey et al. | ............... | 137/202 |
| 6,311,675 B2 | * | 11/2001 | Crary et al. | ................ | 137/202 |
| 6,347,640 B1 | * | 2/2002 | Meyer | ........................ | 137/202 |
| 6,412,511 B1 | * | 7/2002 | Rosseel | ...................... | 137/202 |

FOREIGN PATENT DOCUMENTS

| | | |
|---|---|---|
| JP | 4-74124 | 6/1992 |
| JP | 04-201721 | 7/1992 |
| JP | 06-297968 | 10/1994 |

* cited by examiner

Primary Examiner—Gerald A. Michalsky
(74) Attorney, Agent, or Firm—Posz & Bethards, PLC

(57) ABSTRACT

A fuel cutoff valve includes a full fuel control valve and an overfill prevention valve inside a casing. The overfill prevention valve is equipped with first and second floats. The second float is disposed in the storage chamber inside the first float of the full fuel control valve while being allowed to move up and down. The second float is configured such that a second connection conduit is closed by a second valve element as a result of a rising movement when the fuel level exceeds a second liquid level located above a first liquid level, and the second valve element is connected to a first connection conduit through a second connection conduit to reduce the force with which the first valve element of the first float is pressed against a first seat as a result of the fact that the fuel level has dropped below the second liquid level but is still above the first liquid level.

13 Claims, 13 Drawing Sheets

PRIOR ART

FUEL CUTOFF VALVE

CROSS REFERENCE TO RELATED APPLICATIONS

This application claims the benefit of and priority from Japanese Applications No. 2000-171579 filed Jun. 8, 2000 and No. 2001-11652 filed Jan. 19, 2001, the contents of which are incorporated herein by reference.

BACKGROUND OF THE INVENTION

1. Field of the Invention

The present invention relates to a fuel cutoff valve mounted on a fuel tank. More particularly, the invention relates to fuel cutoff valves for use in automobiles.

2. Description of Related Art

A conventional fuel cutoff valve is described in JPA 6-297968. In FIG. 14, which shows a conventional fuel valve, a fuel cutoff valve 200 comprises a full fuel control valve that shuts off when the full fuel level is exceeded, and an overfill prevention valve that shuts off when the fuel is fed past the full fuel level, and the overfill level is exceeded. Specifically, the fuel cutoff valve 200 comprises a casing 202 mounted on a fuel tank (not shown), a first float valve 210 housed in the casing 202, a spring 219 for urging the first float valve 210, and a second float valve 220 housed in the first float valve 210. The upper end of the casing 202 is provided with a wall 204. A connection hole 204a connected to a fuel vapor exhaust pipe 206 is formed in the center of the wall 204. A retainer 208 is mounted on the lower end of the casing 202.

The first float valve 210 comprises a thick-walled cylindrical lower portion 212, an upper portion 214 configured as an upwardly extending thick-walled cylinder whose lower end is mounted around the upper end portion of the lower portion 212, a cover plate 216 for covering the upper opening of the upper portion 214, and a valve box 218 interposed in an airtight manner between the outer circumference of the lower end of the cover plate 216 and the upper end of the upper portion 214. The first float valve 210 is supported by the spring 219 on the lower portion 212. The center of the cover plate 216 is provided with a projection 216a. The projection 216a is disposed facing the connection hole 204a and can be attached to the connection hole 204a or detached therefrom. The projection 216a is provided with a connection hole 216b, which is coaxially aligned with the connection hole 204a. A vent 214a is provided above the wall surrounding the upper portion 214, and the interior of the upper portion 214 is normally connected to the vapor phase of the fuel tank through the vent 214a and a vent 202a provided to the casing 202. The bottom of the valve box 218 is provided with a connection hole 218a.

The second float valve 220 is disposed inside the upper portion 214. The second float valve 220 is supported by a spring 222 on the upper end face of the lower portion 212 of the first float valve 210, and the upper end thereof is provided with a projection 220a in a facing arrangement with the connection hole 218a. The valve box 218 also houses a relief valve 230. The relief valve 230 is designed to open and close the connection hole 218a by the urging of a valve body 232 with a spring 234.

The operation of the fuel cutoff valve 200 will now be described. The first float valve 210 alone experiences buoyancy when the liquid level inside the tank is in the vicinity of the full fuel liquid level. The first float valve 210 moves up and blocks the connection hole 204a with the projection 216a on the upper end thereof. In the process, the second float valve 220 moves together with the first float valve 210, but the projection 220a leaves the connection hole 218a open because of the absence of mutual displacement between the second float valve 220 and the first float valve 210.

In this state, the relief valve 230 closes the connection hole 218a, so the fuel vapor exhaust pipe 206 is blocked by the mutual engagement of the connection hole 204a and the projection 216a. The relief valve 230 opens when the pressure inside the tank exceeds a predetermined level. The gas inside the tank thus escapes from the fuel vapor exhaust pipe 206 via the vent 202a, vent 214a, connection hole 218a, connection hole 216b, and connection hole 204a, and the inside pressure is kept below a predetermined level.

If the liquid level inside the tank rises in an abnormal manner and the second float valve 220 is also buoyed, the second float valve 220 rises relative to the first float valve 210, blocking the connection hole 218a. The fuel cutoff valve 200 thus operates such that the interior of the fuel tank is separated from the outside by the second float valve 220 when the liquid level exceeds the full fuel liquid level, which is a level at which the first float valve 210 operates as a closing device.

In the fuel cutoff valve 200, the connection hole 204a is a narrow conduit incapable of rapidly removing fuel vapors into the canister from the fuel tank when a large amount of fuel is supplied. However, increasing the surface area of the conduit formed by the connection hole 204a increases the seal diameter and presses the first float valve 210 with greater force against the sealing surface facing the connection hole 204a. A resulting shortcoming is that the first float valve 210 does not open as readily, that is, valve reopening characteristics are adversely affected, when the liquid level of the fuel tank drops below a prescribed value. Techniques in which the floats are provided in two stages have been proposed as a means to overcome this shortcoming, as have been structures in which the full fuel control valve and the overfill prevention valve are provided at separate locations, but these structures are too complicated and make vehicles harder to assemble.

SUMMARY OF THE INVENTION

An aspect of the present invention is to provide a fuel cutoff valve that is capable of preventing overfilling, possesses improved valve reopening characteristics, and has a simple structure.

The present invention provides a fuel cutoff valve mounted on a fuel tank and is designed to connect the interior of the fuel tank with the outside or to separate the tank from the outside. The fuel cutoff valve is characterized by a casing including a casing main body partially extending into the upper portion of the fuel tank and having a first valve chamber, an outer conduit disposed outside the fuel tank, a first connection conduit designed to connect the outer conduit and the first valve chamber and configured such that the conduit surface area thereof is at least $\frac{1}{3}$ that of the outer conduit, and a first seat disposed on the side of the first valve chamber facing the first connection conduit. A first float including a first float main body is disposed inside the first valve chamber and is capable of moving up and down. A first valve element opens and closes the first connection conduit by attaching itself to and detaching itself from the first seat provided to the upper portion of the first float main body. A storage chamber is formed in the axial center of the first float main body and is designed to form a connection with the first valve chamber. A second connection conduit is disposed in the upper portion of the first float main body and is designed to connect together the first connection conduit and the storage chamber and provided with a smaller conduit surface area than the first connection conduit. A second float including a second float main body is disposed in the storage chamber and is capable of moving up and down. A second valve element is disposed in the upper portion of the second float main body and is designed to open and close the second connection conduit. The first float is configured such that the first connection conduit is closed by the first valve element as a result of a rising movement when the fuel level in the fuel tank exceeds a first liquid level. The second float is configured such that the second connection conduit is closed by the second valve element as a result of a rising movement when the fuel level exceeds a second liquid level located above the first liquid level. The storage chamber is connected to the first connection conduit through the second connection conduit to reduce the force with which the first valve element is pressed against the first seat as a result of the fact that the fuel level has dropped below the second liquid level but is still above the first liquid level.

In the fuel cutoff valve pertaining to the present invention, the interior of the fuel tank is connected to the outside through the first valve chamber, first connection conduit, and outer conduit when the fuel level inside the fuel tank does not exceed the first liquid level. The first connection conduit is not constricted by the outer conduit, which is shaped such that the connection conduit surface area is at least ⅓ of the outer conduit surface area, allowing the fuel vapors in the fuel tank to rapidly escape outside.

The first float rises when the fuel level in the fuel tank exceeds the first liquid level as a result of refueling, whereby the first valve element is pressed against the first seat, the first connection conduit is closed, and the liquid fuel is prevented from flowing outside. At this time, the second connection conduit remains open, and the interior of the fuel tank is connected to the outside. When the liquid fuel rises further and exceeds a second liquid level which is above the first liquid level, the second float rises, the second valve element is pressed against a second seat, and the second connection conduit is closed. Thus, supplying fuel until the second liquid level is exceeded will raise the pressure inside the fuel tank and will trigger the fuel cutoff valve into stopping the supply of fuel.

As the fuel is consumed and the fuel level drops below the second liquid level, the second valve element is pushed away from the second seat, and the second connection conduit is opened by the descending second float. The storage chamber is thereby connected to the first connection conduit, and the pressure difference for the first connection conduit is reduced to zero. The absence of pressure difference is equivalent to reducing the force with which the first valve element is pressed against the first seat, allowing the first valve element to move smoothly away from the first seat.

Thus, the second float has a valve-closing function for closing the conduit at the second liquid level, and a valve reopening function for facilitating the reopening of the channel by the first float. In addition, the second float is disposed inside a storage chamber formed in the axial center of the first float, making it possible to implement these two functions in a compact structure.

According to a preferred embodiment, the first float has a cylindrical portion that extends from the lower end of the first float to a point below the lower end of the casing, the space inside the cylindrical portion constitutes part of the storage chamber, and the lower portion of the second float is disposed partially in the storage chamber. The second float can thus be elongated and housed in the storage chamber of the cylindrical portion. The outside diameter of the second float can be reduced, and the float itself can be compactly configured.

According to another preferred embodiment, the first float has a lower cover oriented substantially horizontally and disposed somewhat above the lower end of the first float such that the lower cover partitions off the lower side of the storage chamber.

With this structure, the second float is configured such that after the lower portion of the first float is immersed in fuel, the fuel enters the storage chamber and the buoyancy chamber, and buoyancy is created. Specifically, raising the liquid level above that of the first float is the factor that allows the second float to become buoyant, making it possible to move the start of level increase closer to the second liquid level and to facilitate setting the level at which the conduit is securely closed once the second liquid level is exceeded.

According to a preferred embodiment of the lower cover, the amount of fuel entering the buoyancy chamber can be reduced by adopting a structure in which a cylindrical projection extends toward the buoyancy chamber and has a smaller volume than the buoyancy chamber. Rapid discharge can therefore be achieved and the second float can descend unimpeded when the fuel enters the buoyancy chamber as a result of the rising fuel level.

Another feature of the first float is that connection holes for reducing the lift of the second float by reducing the negative pressure and the flow of air through the storage chamber can be provided at a plurality of locations in the vertical direction of the first float.

In the first float thus configured, the air flowing toward the storage chamber and the second connection conduit via side connection holes can be slowed down by providing the float upper body with side connection holes connected to the storage chamber. The negative pressure in the upper portion of the storage chamber can be reduced by the formation of a connection hole in the upper portion of the float lower body, making it possible to reduce the force that moves the second float upward.

Consequently, the second float can be accurately lifted at a position in which the second liquid level is exceeded because of a reduction in the lifting force acting on the air flowing through the storage chamber. That is, a reduction in the lifting force existing before the fuel level exceeds the second liquid level.

The wide first connection conduit can be provided with a tight seal by forming the first valve element from a plate-shaped seat material.

The casing comprises a third connection conduit for connecting the interior of the fuel tank to the outside, and a relief valve for opening the third connection conduit when the pressure inside the fuel tank rises above a predetermined level. This arrangement allows the pressure inside the fuel tank to be kept below a predetermined level.

According to another preferred embodiment, the fuel cutoff valve comprises a third float disposed in a facing arrangement with the relief valve and designed to close the third connection conduit when a third liquid level, which is located above the second liquid level, is exceeded. With this arrangement, fuel is prevented from escaping outside when the vehicle vibrates, tilts, or the like.

According to a preferred embodiment of the third float, the third connection conduit is disposed eccentrically in relation to the central axis of the first valve chamber, the third float is disposed above the first float inside the first valve chamber and is provided with substantially the same diameter as the first float, and a third valve element is placed in a facing arrangement with the third connection conduit. The third float should preferably be rendered nonrotatable relative to the casing to prevent the third valve element from changing its position.

BRIEF DESCRIPTION OF THE DRAWINGS

FIG. 8 shows the manner in which the rollover valve performs an opening sequence as a result of vehicle vibration, tilting, or the like;

DETAILED DESCRIPTION OF PREFERRED EMBODIMENTS

Figure 1:
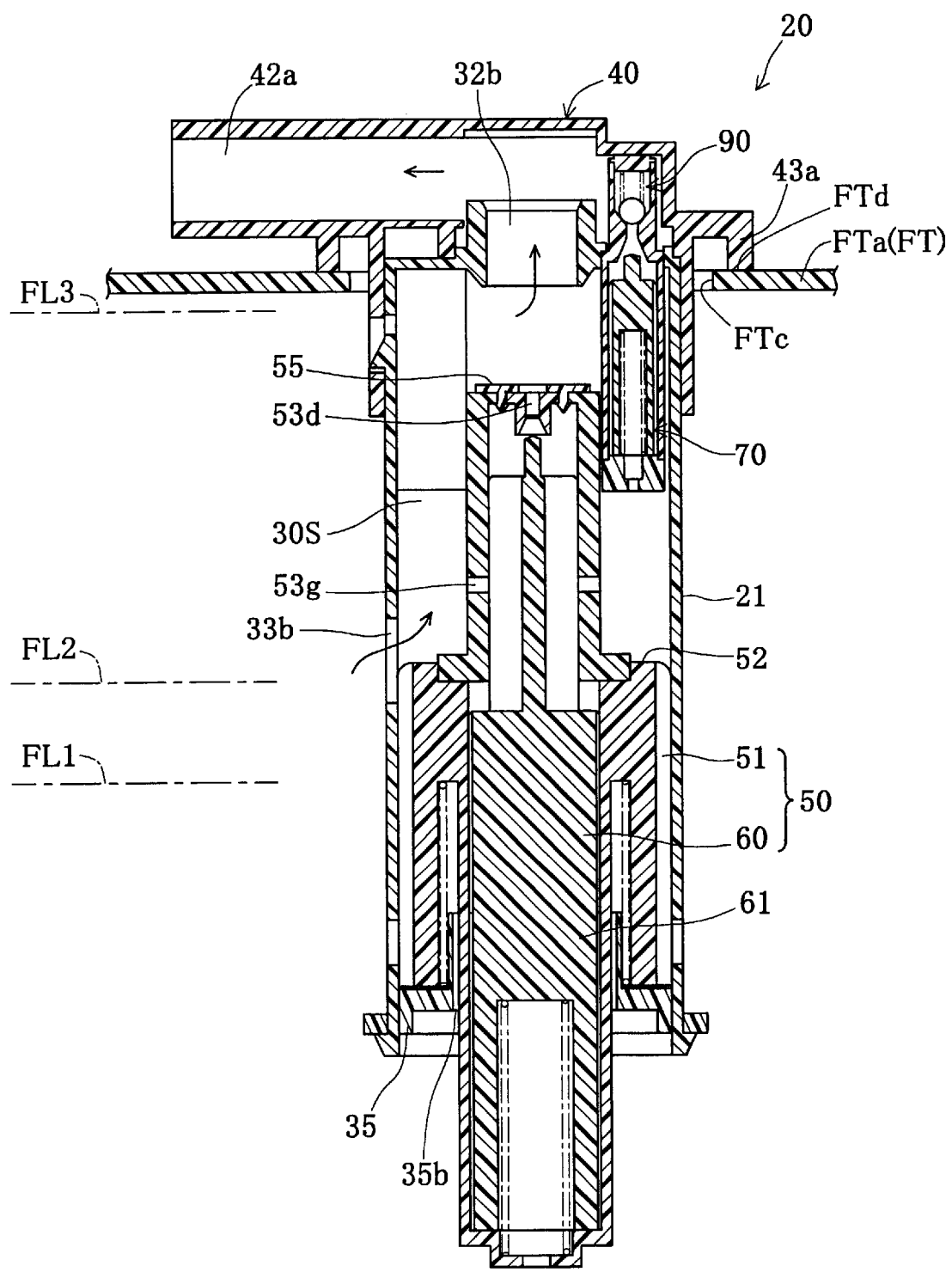
FIG. 1 is a cross-sectional view depicting a fuel cutoff valve mounted on the fuel tank of an automobile in accordance with an embodiment of the present invention.

FIG. 1 is a cross-sectional view depicting a fuel cutoff valve 20 mounted on a fuel tank FT of an automobile in accordance with an embodiment of the present invention. In FIG. 1, the fuel tank FT comprises a tank upper wall FTa whose surface is formed from a polyethylene-containing composite resin material, and the tank upper wall FTa is provided with a mounting hole FTc. The fuel cutoff valve 20 is mounted by being fitted into the mounting hole FTc in the tank upper wall FTa.

The fuel cutoff valve 20 is designed to prevent the spillage of fuel to the outside (canister) and to keep the pressure inside the tank below a predetermined level when the fuel in the fuel tank FT reaches a determined liquid level during refueling or the like. The determined liquid level referred to herein may be a first liquid level FL1, which is reached when the tank is completely filled with fuel during refueling, a second liquid level FL2, which is reached when fuel continues to be fed from the fuel gun past the first liquid level FL1, and a third liquid level FL3, which is established to prevent fuel from leaking outside during vehicle vibration or tilting. The structure and operation of the units constituting the fuel cutoff valve 20 will now be described.

The fuel cutoff valve 20 comprises a casing 21 welded to the upper wall FTa of the fuel tank FT. The casing 21 houses a float valve assembly 50 including a full fuel control valve 51 and an overfill prevention valve 60, a rollover valve 70, and a relief valve 90.

Figure 2:
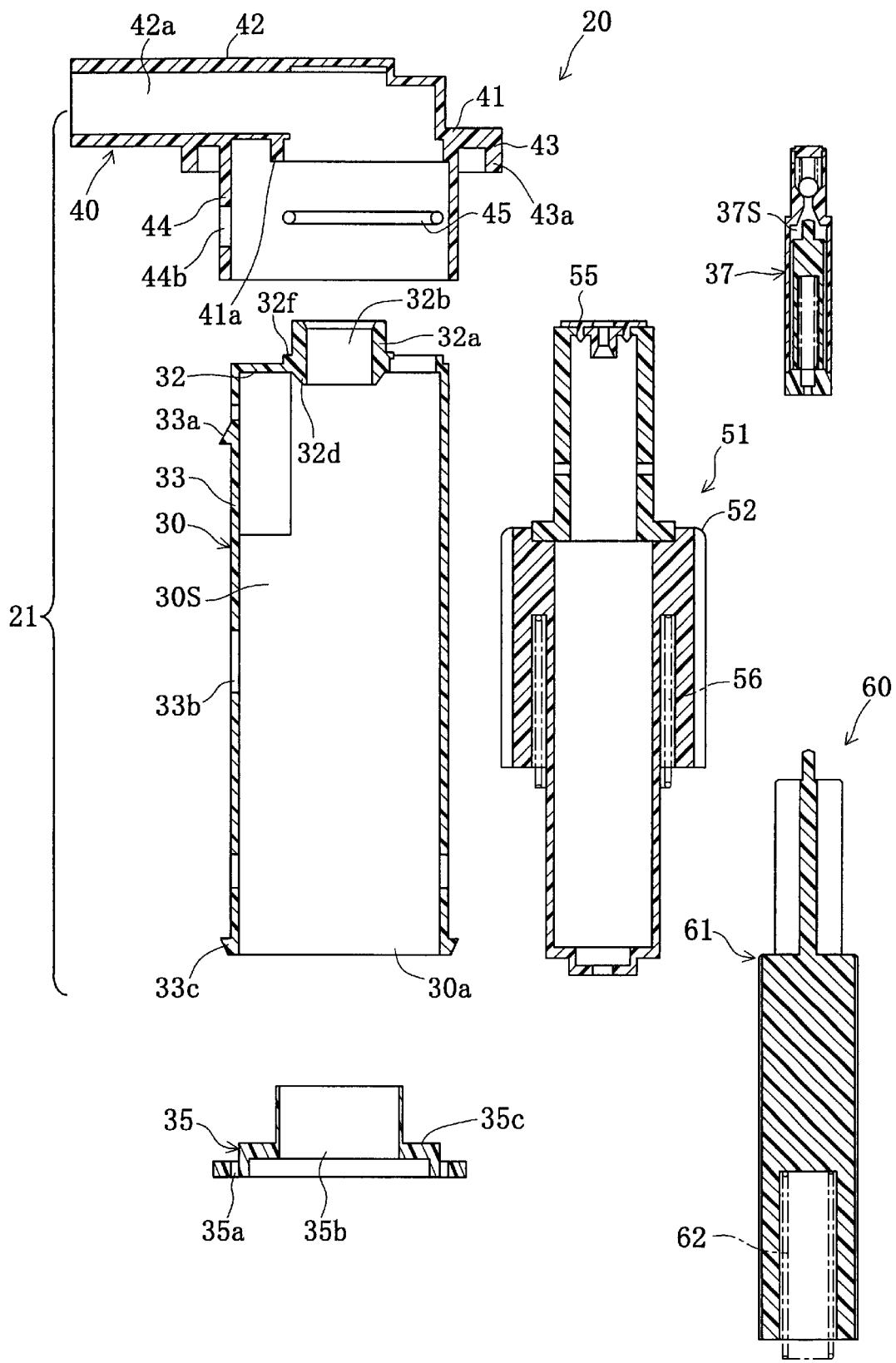
FIG. 2 is an exploded cross-sectional view of the fuel cutoff valve.

FIG. 2 is an exploded cross-sectional view of the fuel cutoff valve 20. In FIG. 2, the casing 21 comprises a cylindrical casing main body 30 designed to form a first valve chamber 30S, a bottom plate 35 mounted in the lower portion of the casing main body 30, a valve-forming body 37 disposed inside the upper portion of the first valve chamber 30S and designed to form a second valve chamber 37S, and a cover 40 welded to the tank upper wall FTa and mounted on the casing main body 30.

The casing main body 30 comprises a top wall 32 and a side wall 33 extending down from the top wall 32 in a cylindrical configuration. The cup-shaped first valve chamber 30S is formed as an enclosure by the top wall 32 and side wall 33, and the lower portion thereof is fashioned as a lower opening 30a. An upper projection element 32a is formed in the center of the top wall 32. A first connection conduit 32b passes through the upper projection element 32a, and the side of the first connection conduit 32b facing the first valve chamber 30S is fashioned as an annular first seat 32d. A ring step 32f for supporting an O-ring 45 is formed on the outer circumferential side wall of the upper projection element 32a. The side wall 33 has an engagement projection 33a for mounting the cover 40 over the middle portion thereof, a connection hole 33b for connecting the first valve chamber 30S and the fuel tank FT, and an engagement pawl 33c for mounting the bottom plate 35 on the lower portion thereof.

The bottom plate 35, which is a member designed to partially close the lower opening 30a of the casing main body 30, is mounted in the lower portion of the casing main body 30 by bringing an engagement aperture 35a formed in the outer circumferential portion thereof into engagement with the engagement pawl 33c. A through hole 35b is formed in the center of the bottom plate 35.

The cover 40 comprises, in a monolithic arrangement, a cover main body 41, a tubular body 42 extending upward in an L-shape from the center of the cover main body 41, a flange 43 formed around the outside of the cover main body 41, and a cover fitting element 44 extending from the lower portion of the cover main body 41. A cover fitting element 41a for accommodating the upper projection element 32a of the casing main body 30 is formed in the center of the lower portion of the cover main body 41. The tubular body 42 is also provided with an outer conduit 42a. One end of the outer conduit 42a is connected to the first connection conduit 32b of the casing main body 30; the other end is connected to the canister. The lower end portion of the flange 43 is further provided with a circular welding end 43a to be welded to the upper wall FTa of the fuel tank FT (FIG. 1). The fitting element 44 is fashioned as a cylindrical projection for receiving the upper end of the casing main body 30 and is provided over part of its surface with an engagement aperture 44b and a slit (not shown) that is left open on the side facing the lower end.

Figure 3:
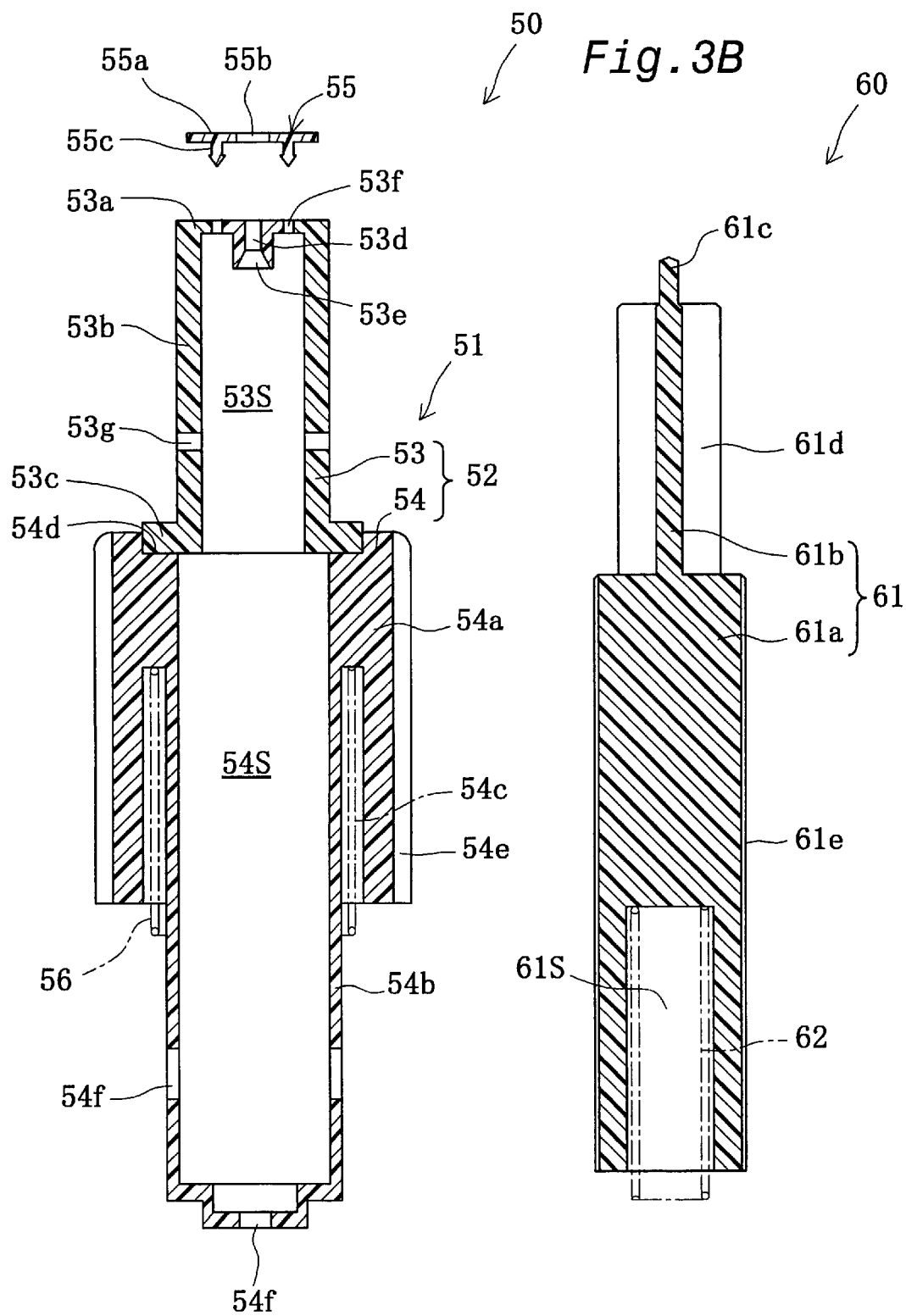
FIG. 3A is a cross-sectional view depicting one part of a float valve assembly.
FIG. 3B is a cross-sectional view depicting another part of the float valve assembly shown in FIG. 3A.

The float valve assembly 50 shown in FIG. 1 will now be described. FIGS. 3A and 3B are an exploded cross-sectional view depicting part of the float valve assembly 50. The float valve assembly 50 comprises floats and springs as components that constitute the full fuel control valve 51 (FIG. 3A) and the overfill prevention valve 60 (FIG. 3B).

The full fuel control valve 51, which is designed to prevent the fuel inside the fuel tank FT from flowing toward the canister by closing the first connection conduit 32b when the first liquid level FL1 (see FIG. 1) is exceeded, comprises a first float 52 and a first spring 56. The first float 52 comprises a float upper body 53, a float lower body 54 for supporting the float upper body 53 on the lower end of the float upper body 53, and a first valve element 55 formed on the first float 52. The float upper body 53 comprises a top wall 53a and a side wall 53b, which is formed in a cylindrical configuration around the outside of the top wall 53a. The top wall 53a and side wall 53b form a storage chamber 53S. The lower end of the side wall 53b has a flange 53c. The top wall 53a is provided with a second connection conduit 53d for connecting the interior of the float upper body 53 to the outside. The lower end of the second connection conduit 53d has a second seat 53e. The side wall 53b has a side connection hole 53g. The first valve element 55 is shaped as a rubber disk and is mounted on the first float 52 by causing the engagement projections 55c to engage a fixation aperture 53f. The upper surface of the first valve element 55 has a seat 55a, which is attached to or detached from the first seat 32d (see FIG. 2) by the lifting or lowering of the first float 52. A connection hole 55b is also formed in the center of the first valve element 55 to connect the storage chamber 53S and the first connection conduit 32b via the second connection conduit 53d.

The float lower body 54 comprises a float lower main body 54a and a lower cylindrical body 54b, which is narrower than the float lower main body 54a and is formed monolithically with the lower end of the float lower main body 54a. An attachment recess 54d is formed in the upper portion of the float lower main body 54a. The flange 53c of the float upper body 53 is positioned in, and fixedly welded to, the attachment recess 54d. A guide protrusion 54e, which is formed around the outside of the float lower main body 54a, is guided by the inner wall of the casing main body 30 (FIG. 2). The lower cylindrical body 54b, which is a bottomed cylinder extending downward from the lower end of the float lower main body 54a, is slidably passed via the through hole 35b of the bottom plate 35 (FIG. 2), with the interior thereof forming a storage chamber 54S. A connection hole 54f is formed in the bottom of the float lower main body 54a to connect the storage chamber 54S and the interior of the fuel tank.

A circular clearance 54c is formed between the float lower main body 54a and the lower cylindrical body 54b. The circular clearance 54c accommodates a first spring 56. The first spring 56 is mounted on the spring support 35c of the bottom plate 35 (FIG. 2) and is designed to support the first float 52.

The overfill prevention valve 60 will now be described. The overfill prevention valve 60, which prevents liquid fuel from escaping by closing the second connection conduit 53d when the second liquid level FL2, which is above the first liquid level FL1 shown in FIG. 1, is exceeded, comprises a second float 61. This second float 61 is housed in the storage chambers 53S and 54S of the first float 52 while capable of moving up and down inside these chambers. The second float 61 comprises a second float main body 61a and an upper projection 61b, which extends in a cylindrical configuration of a smaller diameter than the second float main body 61a in the upper portion of the second float main body 61a. The upper end of the upper projection 61b is provided with a substantially conical second valve element 61c. The outer circumferential portion of the upper projection 61b and second float main body 61a is provided with axially oriented guide fins 61d and 61e. The guide fins 61d and 61e are guided by the side wall 53b and the inner walls of the float lower main body 54a. A second spring 62 is housed in a buoyancy chamber 61S, which is formed in the axial portion of the second float 61. The second spring 62 is mounted on the lower end of the lower cylindrical body 54b and is designed to urge the second float 61 upward.

Figure 4:
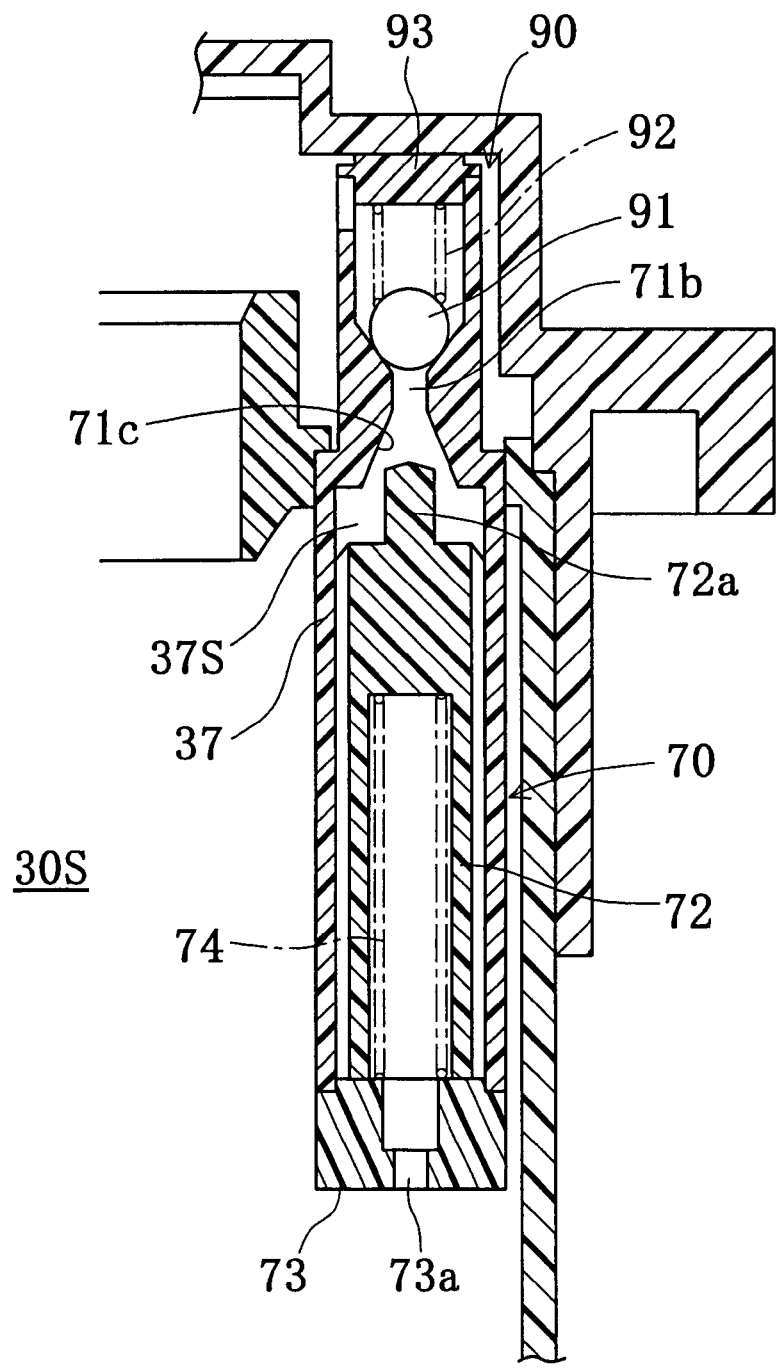
FIG. 4 is a partial enlarged cross-sectional view of a rollover valve and relief valve.

FIG. 4 is an expanded cross-sectional view of the area in the vicinity of the rollover valve 70 and relief valve 90. In FIG. 4, the rollover valve 70, which is designed to prevent fuel from leaking from the fuel tank to the outside during vehicle vibration, tilting, or the like, is disposed inside the valve-forming body 37 in the upper portion of the first valve chamber 30S. The rollover valve 70 is equipped with a third float 72. The third float 72 is a cylinder slidably accommodated by the second valve chamber 37S, which is formed as an enclosure by the valve-forming body 37 and the bottom plate 73. A conical valve element 72a is formed in the upper portion thereof The valve element 72a can open or close a third connection hole 71b by engaging or disengaging the seating surface 71c of the third connection hole 71b. The third float 72 is supported by a third spring 74, itself mounted on the bottom plate 73. A connection hole 73a is formed in the center of the bottom plate 73 to connect the second valve chamber 37S and the interior of the fuel tank FT. When fuel flows into the second valve chamber 37S through the connection hole 73a, the third float 72 is lifted by increased buoyancy, brought into contact with the seating surface 71c along the valve element 72a, and caused to close the third connection hole 71b. This prevents fuel from leaking outside.

The relief valve 90, which is designed to keep the pressure inside the fuel tank within prescribed limits, is housed in the valve-forming body 37 above the rollover valve 70 in a facing arrangement. The relief valve 90 comprises a ball valve 91 and a fourth spring 92. One end of the fourth spring 92 rests on a support plate 93. The other end of the spring supports the ball valve 91. The relief valve 90 is designed to open against the urging force of the fourth spring 92 and to return the pressure inside the fuel tank to a determined level if the pressure exceeds this level.

Following is a description of the steps involved in mounting the fuel cutoff valve 20 on the upper wall FTa of the fuel tank FT. A first float 52, a second float 61, a rollover valve 70, a relief valve 90, and the like are assembled inside the casing main body 30; an O-ring 45 is fitted over the upper projection element 32a and mounted on the ring step 32f; the fitting element 44 of the cover 40 is fitted over the upper portion of the casing main body 30 in this state; and the upper projection element 32a is fitted into the cover fitting element 41a, as shown in FIG. 2. In the process, the engagement projection 33a is brought into engagement with the engagement aperture 44b, and the cover 40 and casing main body 30 are integrated together.

The lower end portion of the circular welding end 43a of the cover 40 is subsequently melted with a hot plate (not shown), and the material around the mounting hole FTc of the fuel tank FT is melted with a hot plate (not shown), yielding a welding end FTd, as shown in FIG. 1. The casing main body 30 is inserted into the mounting hole FTc from below, and the circular welding end 43a is pressed against the welding end FTd. The cover 40 and the fuel tank FT are thereby welded together. The interior of the fuel tank FT is securely sealed off from the outside by welding the cover 40 to the tank upper wall FTa in this manner.

The operation of the fuel cutoff valve 20 will now be described. When fuel is fed to the fuel tank FT from a fuel gun (not shown) while the fuel cutoff valve 20 is in the state shown in FIG. 1, the fuel vapors remaining in the upper portion inside the fuel tank FT escape toward the canister via the connection hole 33b, first connection conduit 32b, and outer conduit 42a, as well as via the connection hole 33b, side connection hole 53g, and second connection conduit 53d, with increasing fuel level inside the fuel tank FT.

Figure 5:
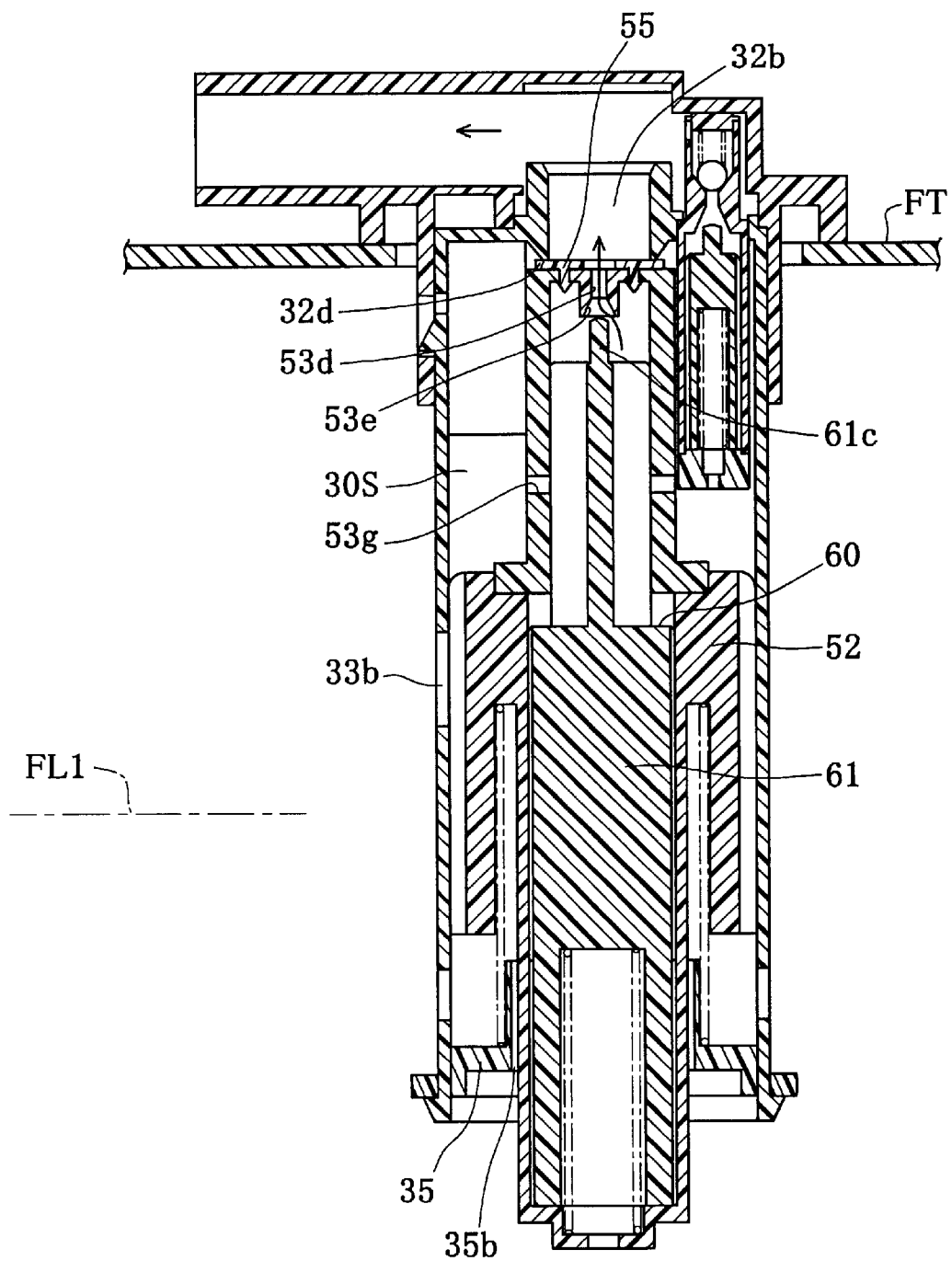
FIG. 5 shows the manner in which the fuel cutoff valve operates when the fuel level exceeds the first liquid level.

The liquid fuel flows into the first valve chamber 30S via the through hole 35b in the bottom plate 35 and increases the buoyancy of the first float 52 with increased fuel level inside the fuel tank, as shown in FIG. 5. The first float 52 is thereby lifted, and the first connection conduit 32b is closed by the first valve element 55. Since the closure of the first connection conduit 32b increases the pressure inside the fuel tank, the fuel gun detects this pressure and stops the fuel supply. The fuel cutoff valve 20 can thus prevent fuel vapors from escaping outside the fuel tank, and liquid fuel from flowing out of the fuel tank during the supply of fuel to the fuel tank or the like.

In the process, the second float 61 of the overfill prevention valve 60 rises together with the first float 52 while remaining at the lower end of the first float 52. The second connection conduit 53d remains open because the buoyancy is low and the position relative to the first float 52 remains the same. Consequently, the interior of the fuel tank is connected with the canister through a reduced conduit surface area via the connection hole 33b, side connection hole 53g, and second connection conduit 53d, and first connection conduit 32b.

Figure 6:
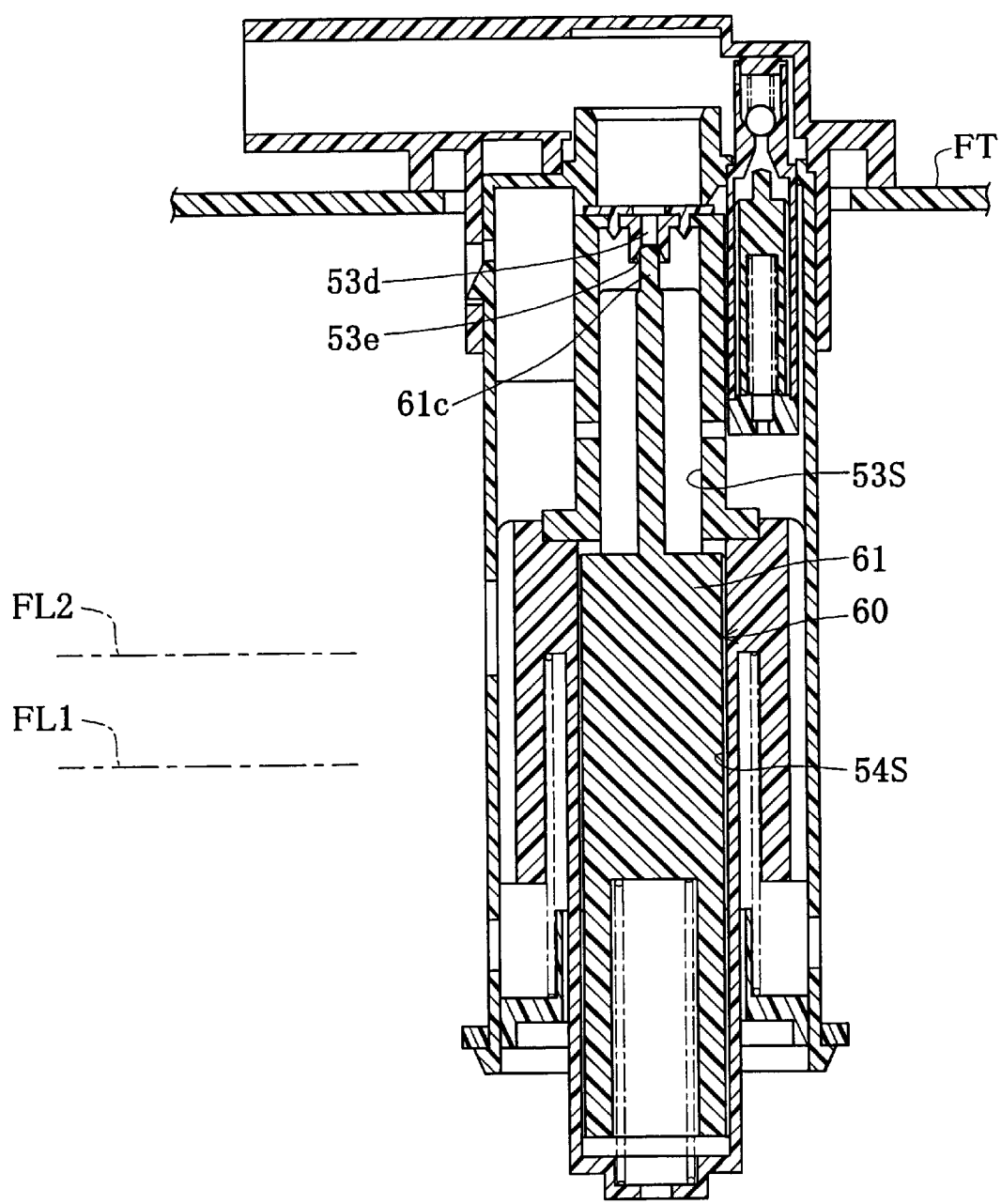
FIG. 6 shows the manner in which the fuel cutoff valve operates when the fuel level exceeds the second liquid level.

Another feature is that the ability of the system to end the supply of fuel at the desired level allows the overfill prevention valve 60 to prevent overfilling when refueling through the fuel gun is continued. Specifically, when the fuel level of the fuel tank rises to the second liquid level FL2, the fuel flowing into the storage chamber 54S lifts the second float 61, the second valve element 61c in the upper portion of the second float 61 is pushed against the second seat 53e, and the second connection conduit 53d is closed, as shown in FIG. 6. When the second connection conduit 53d is closed, the pressure inside the fuel tank increases further, and the fuel gun stops supplying fuel. The overfill prevention valve 60 thus prevents too much fuel from being supplied to the fuel tank when the second liquid level FL2, which is above the first liquid level FL1, is reached.

As the fuel in the fuel tank is consumed and the fuel level decreases, the second float 61 experiences decreased buoyancy and moves down, opening the second connection conduit 53d (transitional state from FIG. 6 to FIG. 5). Because the second valve element 61c has a conical shape and receives pressure over a narrow surface area, the force that presses the valve against the second seat 53e is weak and cannot prevent the second float 61 from descending during this process. Consequently, the second float 61 descends rapidly and opens the second connection conduit 53d. With the second connection conduit 53d open, the pressure inside the storage chamber 53S is equalized through the first connection conduit 32b with the pressure in the vicinity of the first connection conduit 32b. Reducing the pressure difference in this manner weakens the force with which the first valve element 55 is pressed against the first seat 32d, allowing the first float 52 to descend in a smooth manner (state of FIG. 1). Thus, the second float 61, in addition to acting as a overfill prevention valve, also functions to facilitate an improvement in the valve reopening characteristics such that the first float 52 can be opened in a smooth manner.

Figure 7:
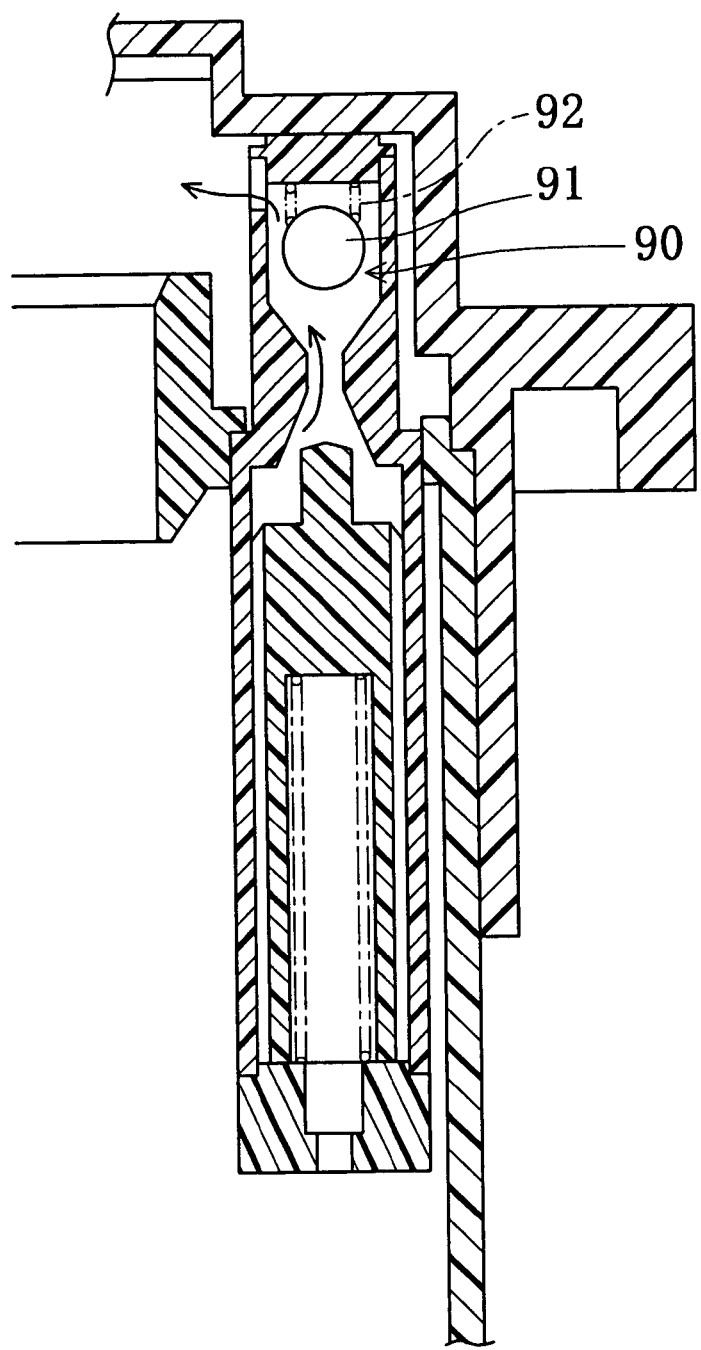
FIG. 7 shows the manner in which the relief valve is opened.

FIG. 7 is a diagram depicting the manner in which the relief valve 90 is opened. When the pressure inside the fuel tank exceeds a determined level, the relief valve 90 is opened by the rising of the ball valve 91 against the urging force of the fourth spring 92, allowing the pressure inside the fuel tank FT to be kept below the determined level, as shown in FIG. 7.

Figure 8:
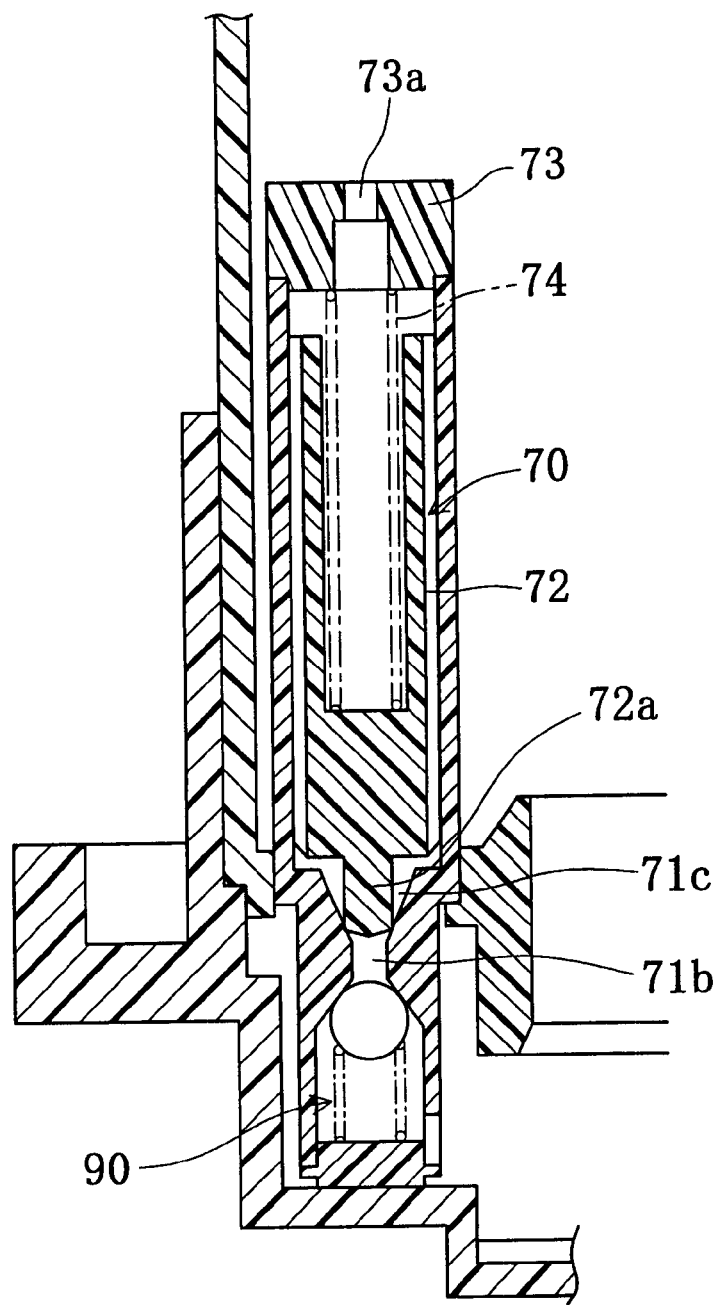

FIG. 8 is a diagram depicting the manner in which the fuel cutoff valve 20 is inverted by vehicle vibration, tilting, or the like. Because in this state fuel flows into the second valve chamber 37S through the connection hole 73a of the rollover valve 70, the third float 72 moves down under its own weight, comes into contact with the seating surface 71c along the valve element 72a, and closes the third connection hole 71b. The fuel from the fuel tank FT is thereby prevented from leaking outside during vehicle vibration or tilting.

Thus, mounting a full fuel control valve 51 and an overfill prevention valve 60 as components of a fuel cutoff valve 20 makes it possible to obtain a compact structure and allows the components to be mounted on a fuel tank with greater ease.

Figure 9:
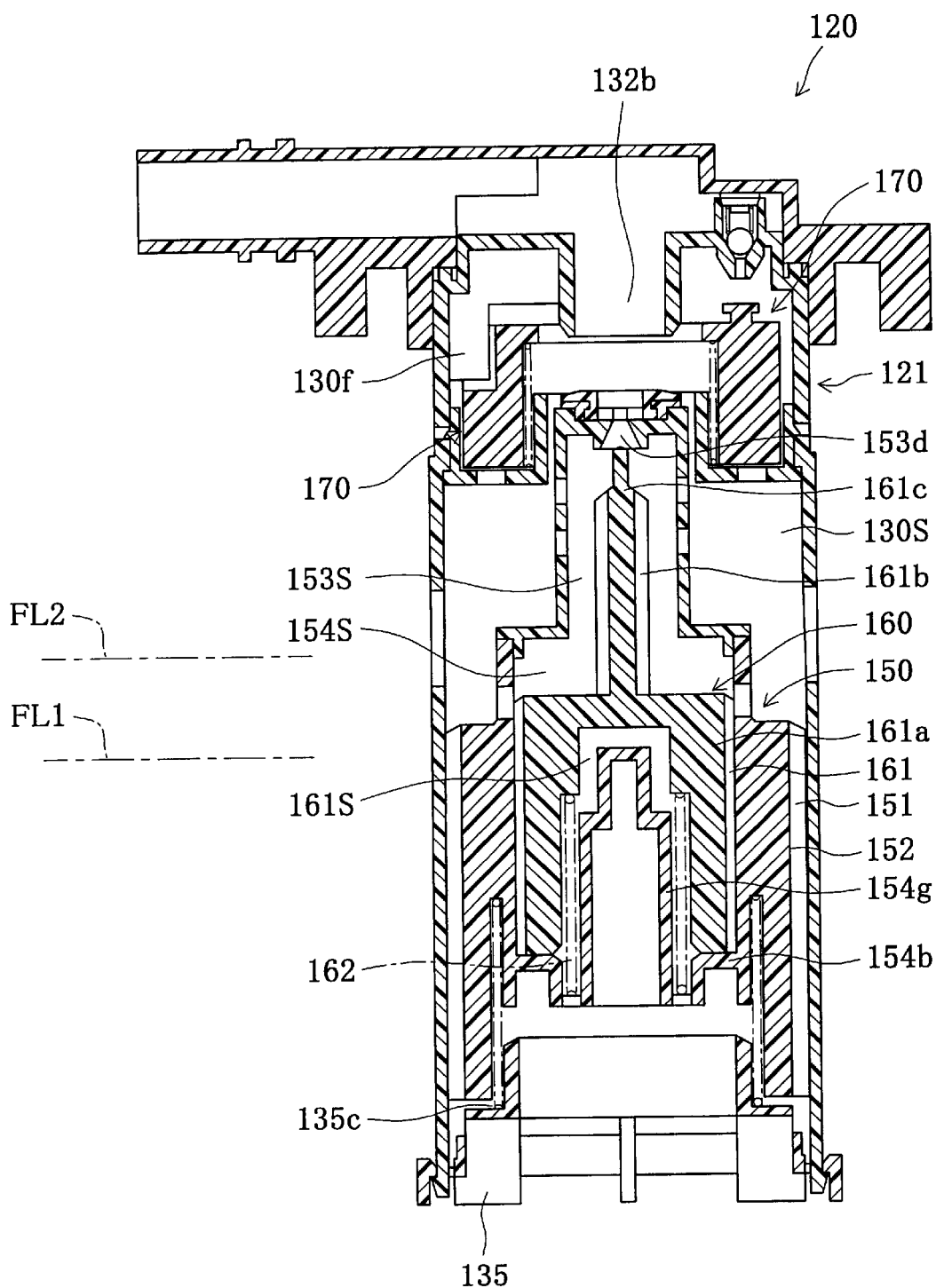
FIG. 9 is a cross-sectional view depicting a fuel cutoff valve mounted on the fuel tank of an automobile in accordance with a second embodiment.

FIG. 9 is a cross-sectional view depicting a fuel cutoff valve 120 mounted on the fuel tank of an automobile in accordance with a second embodiment. The fuel cutoff valve 120 is characterized by employing specific structures for the float valve assembly 150 and rollover valve 170.

Figure 10:
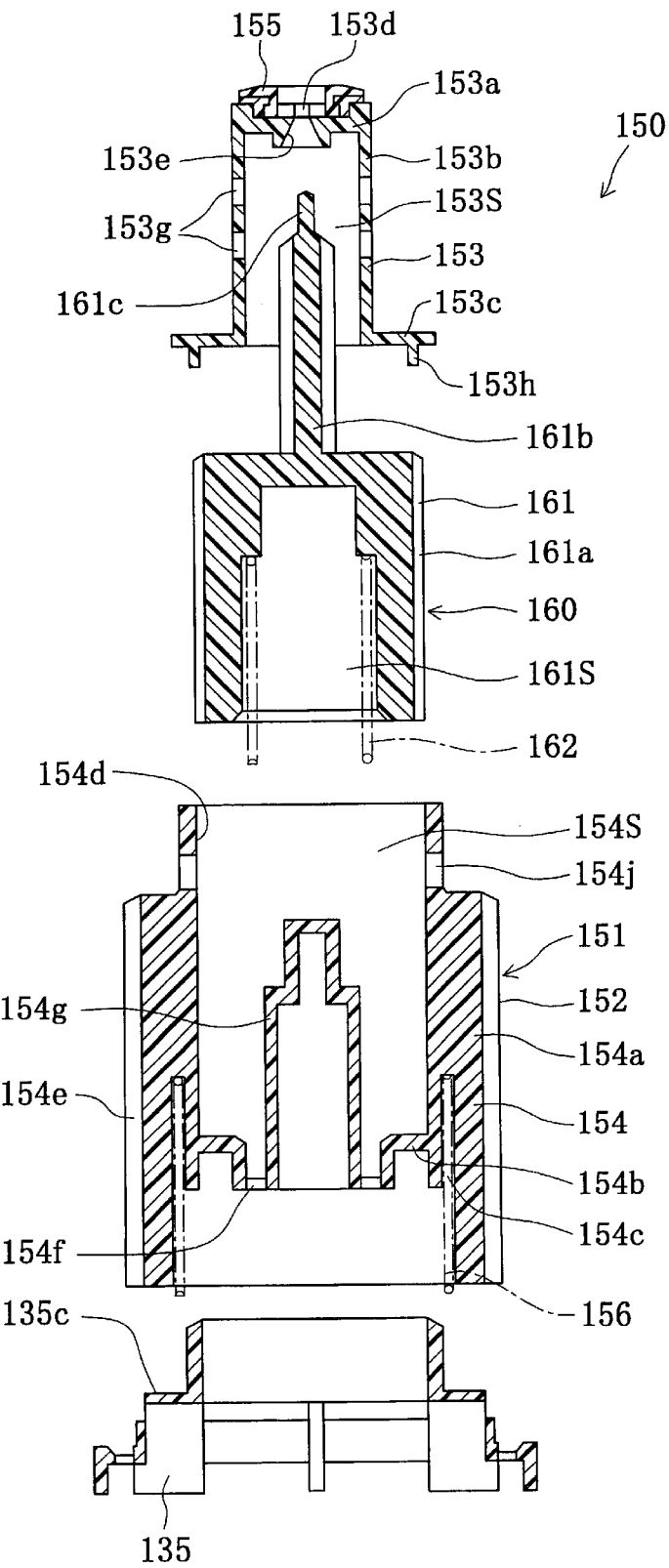
FIG. 10 is an exploded cross-sectional view depicting part of the float valve assembly.

FIG. 10 is an exploded cross-sectional view depicting part of the float valve assembly 150. In FIG. 10, the float valve assembly 150 comprises floats and springs as components that constitute a full fuel control valve 151 and an overfill prevention valve 160.

The full fuel control valve 151, which is designed to close a first connection conduit 132b when the first liquid level FL1 (FIG. 9) is exceeded, comprises a first float 152 and a first spring 156. The first float 152 comprises a float upper body 153, a float lower body 154 for supporting the float upper body 153 on the lower end of the float upper body 153, and a first valve element 155 made of rubber and mounted on the first float 152.

The float upper body 153 comprises a top wall 153a and a side wall 153b, the side wall 153b being formed in a cylindrical configuration around the outside of the top wall 153a. The top wall 153a and side wall 153b form a storage chamber 153S. The top wall 153a is provided with a second connection conduit 153d for connecting the interior of the float upper body 153 to the outside. The lower end of the second connection conduit 153d has a second seat 153e. The lower end of the side wall 153b has a flange 153c. An engagement step 153h extends from the lower surface of the flange 153c.

The side wall 153b is provided with side connection holes 153g, 153g disposed at two vertically spaced positions.

The float lower body 154 comprises a float lower main body 154a and a lower cover 154b, which is formed monolithically with the lower end of the float lower main body 154a and is designed to close the lower portion of the float lower main body 154a. An opening 154d is formed in the upper portion of the float lower main body 154a. The engagement step 153h on the flange 153c of the float upper body 153 is positioned in, and fixedly welded to, the opening 154d. A guide protrusion 154e, which is formed around the outside of the float lower main body 154a, is guided by the inner wall of the casing main body 130 (FIG. 9). A two-step cylindrical projection 154g extends from the upper surface of the lower cover 154b toward the storage chamber 154S. A connection hole 154j is formed in the upper portion of the float lower main body 154a, and a connection hole 154f is formed in the bottom of the float lower main body 154a to connect the storage chamber 154S and the interior of the fuel tank.

A circular clearance 154c is formed between the float lower main body 154a and the lower cover 154b. The upper end of the first spring 156 is inserted into the circular clearance 154c. The first spring 156 is mounted on the spring support 135c of the bottom plate 135 (FIG. 9) and is designed to support the first float 152.

The overfill prevention valve 160 will now be described. The overfill prevention valve 160 is provided with a second float 161 and is designed to close the second connection conduit 153d when the second liquid level FL2 (FIG. 9) is exceeded. The second float 161 comprises a second float main body 161a and an upper projection 161b, which extends in a cylindrical configuration of a smaller diameter than the second float main body 161a in the upper portion of the second float main body 161a. The central portion of the second float main body 161a forms a bottomless buoyancy chamber 161S. The upper end of the upper projection 161b is provided with a substantially conical second valve element 161c. The cylindrical projection 154g of the lower cover 154b extends into the buoyancy chamber 161S, reducing the capacity of the buoyancy chamber 161S. A second spring 162 is disposed in the buoyancy chamber 161S. The second spring 162 is mounted on the circumferential upper surface of the lower cover 154b and is designed to urge the second float 161 upward.

The operation of the fuel cutoff valve 120 will now be described. Although the fuel cutoff valve 120 is caused to operate in substantially the same manner as in the first embodiment by the raising and lowering of the fuel level, the following distinctive features are provided as a result of the fact that a different configuration is selected for the first float 152.

First, the second float 161 is configured such that after the lower portion of the first float 152 is immersed in fuel, the fuel enters the storage chamber 154S and the buoyancy chamber 161S, and buoyancy is created. Specifically, raising the liquid level above that of the first float 152 is the factor that allows the second float 161 to create buoyancy, making it possible to move the start of level increase closer to the second liquid level and to facilitate setting the level at which the conduit is securely closed once the second liquid level FL2 is exceeded.

Figure 11:
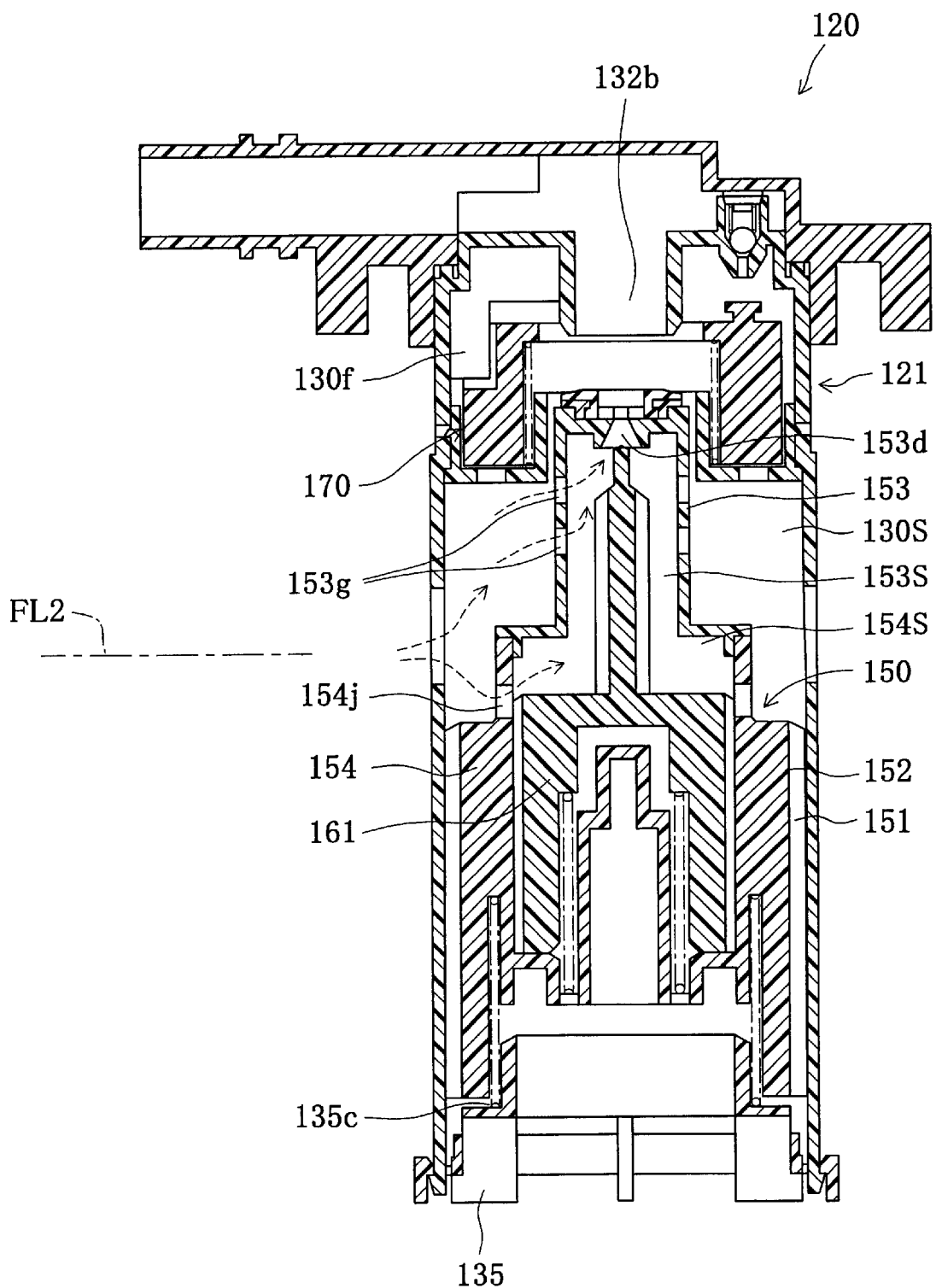
FIG. 11 shows the operation of the fuel cutoff valve.

Second, in the first float 152, the air flowing toward the storage chamber 153S and the second connection conduit 153d via the side connection holes 153g, 153g can be slowed down by providing the float upper body 153 with a wide aperture in which the side connection holes 153g, 153g are disposed at two vertically spaced positions, and the negative pressure in the upper portion of the storage chamber 154S can be reduced by the formation of a connection hole 154j in the upper portion of the float lower body 154, making it possible to reduce the force that moves the second float 161 upward, as shown in FIG. 11.

A setting that allows the conduit to be securely closed at a position above the second liquid level FL2 can therefore be obtained because the second float 161 is configured such that the air flowing through the storage chamber 153S produces only a slight increase in acting force; that is, a smaller increase in acting force is obtained before the fuel level exceeds the second liquid level FL2.

Third, less fuel enters the buoyancy chamber 161S because the lower cover 154b is provided with a cylindrical projection 154g that extends into the buoyancy chamber 161S and reduces the capacity of the buoyancy chamber 161S, as shown in FIG. 9. Rapid discharge can therefore be achieved and the second float 161 can descend unimpeded when fuel enters the buoyancy chamber 161S as a result of the rising fuel level.

Figure 12:
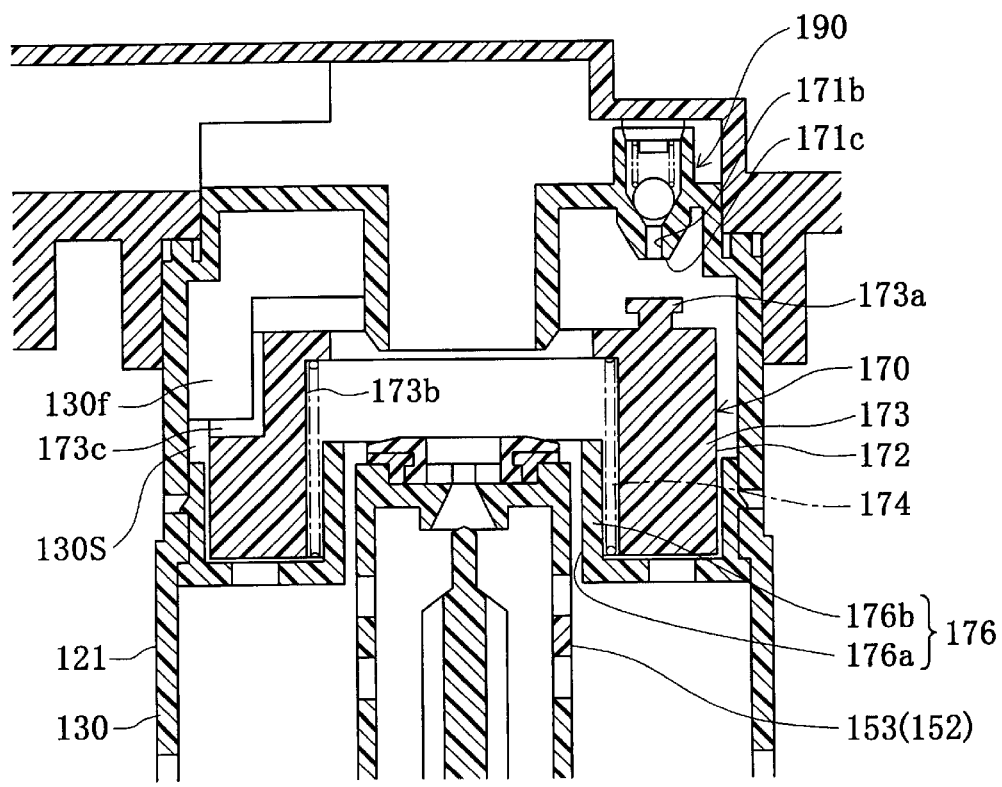
FIG. 12 is a partial enlarged cross-sectional view of the area in the vicinity of the rollover valve and relief valve.

FIG. 12 is an expanded cross-sectional view of the area in the vicinity of the rollover valve 170 and relief valve 190. In FIG. 12 the rollover valve 170 is designed to prevent fuel from leaking from the fuel tank to the outside during vehicle vibration or tilting. In comparison with the first embodiment, a distinctive feature of this structure is that the third float 172 has a large diameter. Specifically, the third float 172 comprises a doughnut-shaped third float main body 173 slidably formed in the upper portion of the first valve chamber 130S, a third spring 174, and a support member 176.

Figure 13:
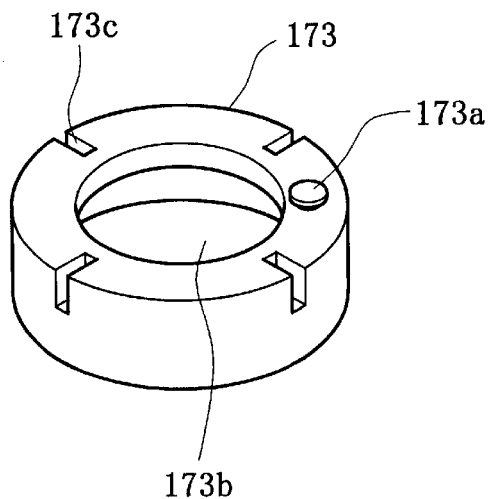
FIG. 13 is a perspective view depicting a third float.
Figure 14:
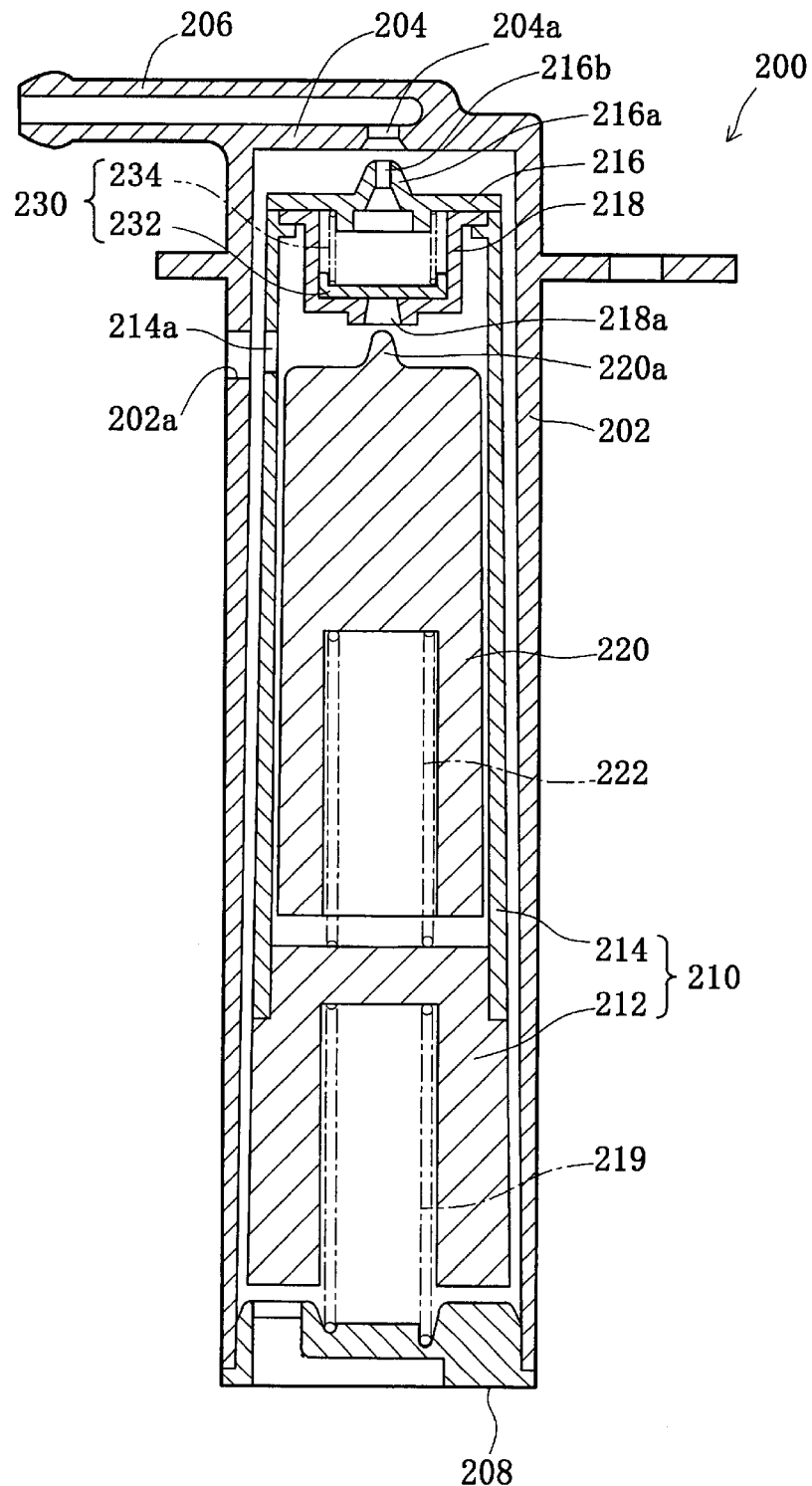
FIG. 14 is a cross-sectional view depicting a conventional fuel cutoff valve.

FIG. 13 is a perspective view depicting the third float 172. In FIGS. 12 and 13, the central portion of the third float main body 173 is provided with a through hole 173b, and the float upper body 153 of the first float 152 extends into this through hole 173b. A third valve element 173a is formed at an off-center position on the upper portion of the third float main body 173. The third valve element 173a opens or closes a third connection conduit 171b by coming into contact or moving away from the seating surface 171c of the third connection conduit 171b.

The support member 176 is brought into engagement with and supported on the inner wall of the casing main body 130 by an outer circumferential engagement projection. A connection hole 176a is formed in the center of the support member 176, and a cylindrical wall 176b is erected around the connection hole 176a. The third spring 174, mounted on the support member 176, is designed to support the third float 172.

Four slits 173c are formed at regular intervals in the circumferential direction in the upper portion of the third float main body 173, as shown in FIG. 13. Fins 130f (only one is shown in FIG. 12) extending as plates from the inner wall of the casing main body 130 are inserted into the slits 173c. This structure allows the third float 172 to act as a rotational detent actuated during vertical movement to prevent the third valve element 173a from shifting its position relative to the seating surface 171c.

The operation of the rollover valve 170 will now be described. When immersed in fuel due to vehicle vibration or tilting, the third float 172 is lifted by the resulting buoyancy and the urging force of the third spring 174 while guided by the fins 130f, and the third valve element 173a comes into contact with the seating surface 171c and closes the third connection conduit 171b. The flow of fuel to the outside is thereby stopped.

Configuring the rollover valve 170 in this manner entails forming the third float 172 as a wide and heavy component capable of sliding in the upper portion of the first valve chamber 130S, allowing the gravity of the third float 172, which is greater than the connecting force of the third valve element 173a, to provide rapid descent when fuel buoyancy decreases as a result of a lower fuel level. Valve reopening characteristics are thereby improved. In particular, the third valve element 173a is eccentrically disposed relative to the third float main body 173, so a moment based on the distance between the center of gravity and the point of support is exerted during valve reopening, making it possible to further improve the valve reopening characteristics.

In addition, the third float 172 is configured such that the fins 130f are inserted into the slits 173c, thereby rendering the third float 172 nonrotatable, making it possible to prevent the third valve element 173a from changing its position in relation to the seating surface 171c.

The present invention is not limited by the working examples and can be implemented in a variety of ways without departing from the subject matter thereof. For example, the following modification is possible.

Although the above embodiments were described with reference to cases in which the casing 21 was formed separately from the casing main body 30 and the cover 40, these cases are nonlimiting and allow the components to be formed into a monolithic configuration, welded to the fuel tank, or fixedly tightened together by means of packing or the like.

The invention is not limited to the embodiments set forth hereinabove, various other embodiments being possible without departing from the spirit of the invention, such as defined by the following claims. For example, the cutoff valve can be utilized in any type of liquid holding tank.

What is claimed is:

1. A cut off valve that opens and closes a connection conduit for connecting a tank to a location exterior to the tank, the cut off valve comprising:
    a casing including (i) a casing main body having a first valve chamber, (ii) an outer conduit, (iii) a first connection conduit having an opening and constructed and arranged to connect the outer conduit and the first valve chamber, a flow area of the first connection conduit being at least ⅓ of the outer conduit, and (iv) a first seat disposed around the opening of the first connection conduit;
    a first float including (i) a first float main body accommodated in the first valve chamber, being capable of moving up and down, (ii) a first valve element formed on the first float main body, the first valve element opening and closing the first connection conduit according to a liquid level in the tank, (iii) a storage chamber formed in an axial center of the first float main body, and (iv) a second connection conduit constructed and arranged to connect the first connection conduit and the storage chamber, a flow area of the second connection conduit being smaller than that of the first connection conduit; and
    a second float including (i) a second float main body accommodated in the storage chamber, being capable of moving up and down, (ii) a second valve element formed on the second float main body, the second valve element opening and closing the second connection conduit, and (iii) a lower cover disposed along an end of the second float main body and being configured to close the storage chamber; and
    a spring disposed in the storage chamber and interposed between the second float main body and the lower cover, the spring being configured to bias the second float main body in an upward direction,
    wherein the first float is constructed such that the first valve element closes the first connection conduit when the level exceeds a first liquid level; and
    the second float is constructed such that the second valve element closes the second connection conduit when the level exceeds a second liquid level higher than the first liquid level, and the second valve element opens the second connection conduit when the level drops below the second liquid level but is still above the first liquid level, thereby reducing a force with which the first valve element is pressed against the first seat.

2. The fuel cut off valve in accordance with claim 1, wherein the first float has a cylindrical body extending downwardly from an end of the casing, an inside space of the cylindrical body constituting a lower part of the storage chamber, the lower part of the storage chamber accommodating a lower part of the second float.

3. The fuel cut off valve in accordance with claim 1, wherein the lower cover is configured to extend substantially horizontally and above a lower end of the first float, and the lower cover defining a lower area of the storage chamber.

4. The fuel cut off valve in accordance with claim 3, wherein the lower cover has a cylindrical projection extending toward a buoyancy chamber formed in the second float main body.

5. The fuel cut off valve in accordance with claim 3, wherein the storage chamber is disposed above a lower end of the casing; and
    the second float is constructed and arranged to rise by a buoyancy of the second float after the first valve element of the first float has closed the first connection conduit.

6. The fuel cut off valve in accordance with claim 3, wherein the first float has through connection holes connecting the storage chamber and the first valve chamber, the through connection holes being disposed in a vertical direction of the first float, thereby reducing a lift force of the second float by reducing negative pressure and a flow of air through the storage chamber.

7. The fuel cut off valve in accordance with claim 1, wherein the first valve element is formed from a plate-shaped seat material.

8. The fuel cut off valve in accordance with claim 1, wherein the casing further includes a third connection conduit connecting the fuel tank and a location exterior of the fuel tank, and wherein the fuel cut off valve further comprises a relief valve constructed and arranged to open the third connection conduit when a pressure in the fuel tank rises above a predetermined level.

9. The fuel cut off valve in accordance with claim 8, further comprising a third float disposed in a facing arrangement with the relief valve and a third valve element formed on an upper portion of the third float, the third valve element being constructed and arranged to close the third connection conduit when the fuel liquid level exceeds a third liquid level higher than the second liquid level.

10. The fuel cut off valve in accordance with claim 9, wherein the first connection conduit is disposed substantially coaxially with the first valve chamber;
    the third connection conduit is disposed eccentrically in relation to a central axis of the first valve chamber;
    the third float is disposed above the first float inside the first valve chamber and has substantially the same diameter as the first float; and
    the third valve element is placed in a facing arrangement with the third connection conduit.

11. The fuel cut off valve in accordance with claim 10, wherein the third float is constructed and arranged to be prevented from rotating relative to the casing.

12. A fuel cut off valve that opens and closes a connection conduit connecting a tank to a location exterior to the fuel tank, the fuel cut off valve being attached to an upper portion of the fuel tank, the fuel cut off valve comprising:
    a casing including (i) a casing main body inserted into the upper portion of the fuel tank, having a first valve chamber, (ii) an outer conduit disposed outside the fuel tank, (iii) a first connection conduit having an opening and constructed and arranged to connect the outer conduit and the first valve chamber, a flow area of the first connection conduit being at least 1/3 of the outer conduit, and (iv) a first seat disposed around the opening of the first connection conduit;

a first float including (i) a first float main body accommodated in the first valve chamber, being capable of moving up and down, (ii) a first valve element formed on the first float main body, the first valve element opening and closing the first connection conduit according to a fuel level in the fuel tank, (iii) a storage chamber formed in an axial center of the first float main body, and (iv) a second connection conduit constructed and arranged to connect the first connection conduit and the storage chamber, a flow area of the second connection conduit being smaller than that of the first connection conduit; and a second float including (i) a second float main body accommodated in the storage chamber, being capable of moving up and down, and (ii) a second valve element formed on the second float main body, the second valve element opening and closing the second connection conduit, a biasing member for urging the second float main body upwardly into the storage chamber of the first float, wherein the first float is constructed such that the first valve element closes the first connection conduit when the fuel level exceeds a first liquid level; and the second float is constructed such that the second valve element closes the second connection conduit when the fuel level exceeds a second liquid level higher than the first liquid level, and the second valve element opens the second connection conduit when the fuel level drops below the second liquid level but is still above the first liquid level, thereby reducing a force with which the first valve element is pressed against the first seat.

13. A cut off valve that opens and closes a connection conduit for connecting a tank to a location exterior to the tank, the cut off valve comprising:

a casing including (i) a casing main body having a first valve chamber, (ii) an outer conduit, (iii) a first connection conduit having an opening and constructed and arranged to connect the outer conduit and the first valve chamber, a flow area of the first connection conduit being at least 1/3 of the outer conduit, and (iv) a first seat disposed around the opening of the first connection conduit;

a first float including (i) a first float main body accommodated in the first valve chamber, being capable of moving up and down, (ii) a first valve element formed on the first float main body, the first valve element opening and closing the first connection conduit according to a liquid level in the tank, (iii) a storage chamber formed in an axial center of the first float main body, (iv) a second connection conduit constructed and arranged to connect the first connection conduit and the storage chamber, a flow area of the second connection conduit being smaller than that of the first connection conduit; and a second float including (i) a second float main body accommodated in the storage chamber, being capable of moving up and down, (ii) a second valve element formed on the second float main body, the second valve element opening and closing the second connection conduit, and (iii) a buoyancy chamber formed along an axial center of the second float main body, wherein the first float is constructed such that the first valve element closes the first connection conduit when the level exceeds a first liquid level;

the second float is constructed such that the second valve element closes the second connection conduit when the level exceeds a second liquid level higher than the first liquid level, and the second valve element opens the second connection conduit when the level drops below the second liquid level but is still above the first liquid level, thereby reducing a force with which the first valve element is pressed against the first seat; and the first float has a lower cover extending substantially horizontally along a lower end of the first float main body, the lower cover having a cylindrical projection extending into the buoyancy chamber.

* * * * *